Jan. 19, 1960
C. H. WILLSEY
2,921,667
EGG BREAKING MACHINE
Original Filed May 16, 1955
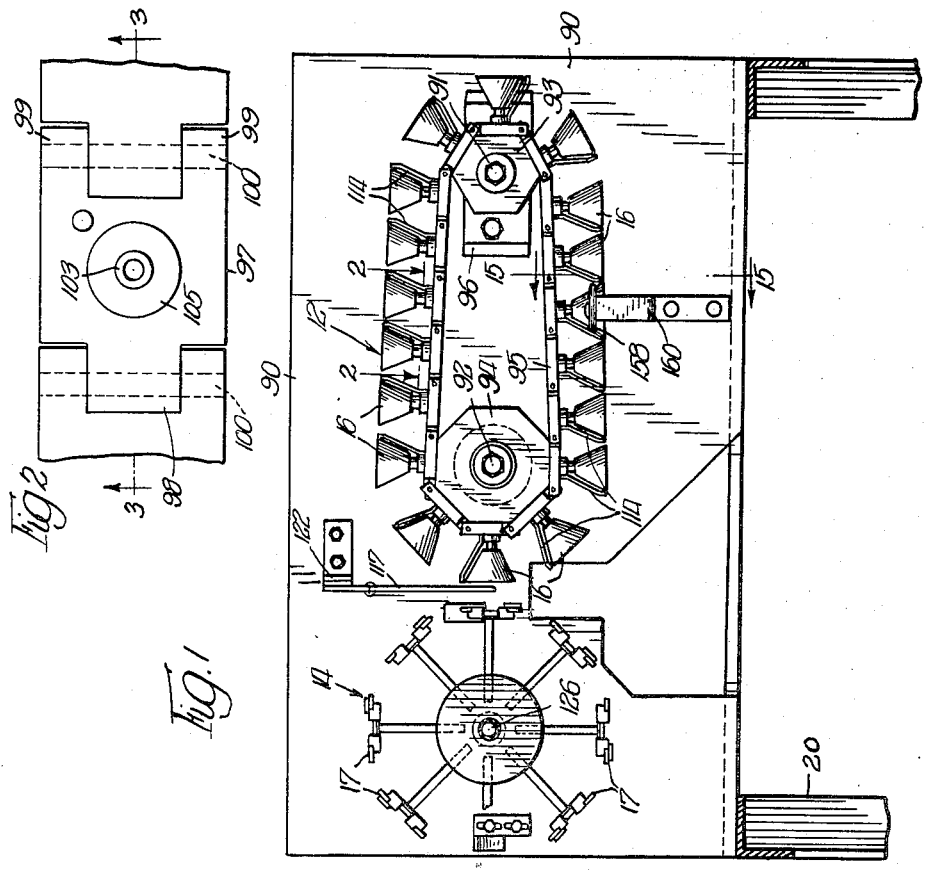
INVENTOR.
Charles H. Willsey,
BY
Cromwell, Greist + Warden
Attys.

United States Patent Office 2,921,667
Patented Jan. 19, 1960

2,921,667
EGG BREAKING MACHINE
Charles H. Willsey, Topeka, Kans.

Original application May 16, 1955, Serial No. 508,542, now Patent No. 2,792,040, dated May 14, 1957. Divided and this application March 5, 1957, Serial No. 644,064

5 Claims. (Cl. 198—179)

This invention relates to egg handling apparatus and is more particularly concerned with improvements in a machine for cracking or breaking successive eggs and for separating the broken shell portions to deliver the contents therefrom to cooperating mechanism for separating the yolks from the whites.

This application is a division of application Serial No. 508,542, filed May 16, 1955, now Patent No. 2,792,040, issued May 14, 1957, to which reference may be had for details not hereinafter shown or described.

It is a general object of the invention to provide an egg handling machine having an improved mechanism for advancing successive eggs to a cracking station where the shells are broken and for thereafter separating the broken shell portions so as to deliver the contents by gravity to successive separating receptacles which are positioned at the cracking station by a cooperating conveyor mechanism.

It is a more specific object of the invention to provide in an egg cracking machine an endless conveyor mechanism having a plurality of egg receiving cups thereon, and a rotary frame at one end of the conveyor having a plurality of egg gripping members thereon which are arranged to cooperate with the cups on the conveyor mechanism whereby to grasp each egg at opposite ends as the cups on the conveyor mechanism move opposite the rotary frame and into cooperating relation with the gripping members on the latter so that the eggs are grasped between the cups and the gripping members while the shells are broken and thereafter the shells are divided into separate portions and the contents are discharged or dumped as the cups on the conveyor mechanism and the gripper members on the rotary frame advance in their respective paths and carry the broken shell portions in opposite directions.

These and other objects and advantages of the invention will be apparent from a consideration of the egg handling machine which is shown by way of illustration in the accompanying drawings, wherein:

Fig. 1 is a side elevation of a machine embodying the principal features of applicant's invention;

Fig. 2 is a section taken generally on the line 2—2 of Fig. 1, to an enlarged scale; and Fig. 3 is a section taken on the line 3—3 of Fig. 2.

Referring particularly to Fig. 1 of the drawings, the machine comprises an egg supporting conveyor mechanism 12 which advances the eggs to a cracking station indicated at 13, and a rotary head or turret 14 which carries mechanism for cooperating with the conveyor 12 to hold successive eggs at the cracking station 13 and associated mechanism (not shown) for cracking the shells of the eggs so that the contents will be delivered therefrom by the separating movement of the shell portions to successive separating devices which are carried on an endless conveyor (not shown) in a path extending beneath the cracking station 13.

The conveyor mechanism 12 which is supported on a vertically extending base plate 90 receives the eggs from an egg feeding and transfer mechanism (not shown) with the ends thereof seated in a series of suction cups or holders 16 and advances the eggs in a single line around the leading end thereof to bring each successive egg into a generally horizontal position at the station 13 where the cracking occurs. Each egg is supported at the cracking station 13 with one end in a holding cup 16 on the conveyor 12 and with the other end in a cooperating holding device forming part of a cracking assembly 17 on the rotary head 14 which is arranged adjacent the leading end of the conveyor 12. While held at the cracking station the successive eggs are broken, or cracked, and as the conveyors 12 and 14 continue their advancing movement the halves of the shells move around beneath the conveyor 12 and the rotary head 14, respectively, and the contents thereof is dumped into a separating device moved into position at station 13 by the separating conveyor.

The vertical frame support plate 90 on which conveyor 12 is supported is generally rectangular in shape and is secured to the base frame 20 in any desired manner. Two spaced shafts 91 and 92 are journaled in the plate 90 and have mounted thereon drum or sprocket formations 93 and 94 which support the endless chain 95 of the conveyor 12. The drum formation 93, which is carried by the shaft 91, forms an idler supporting drum and the shaft 91 is adjustably mounted on the support plate 90 by bracket 96 which may be adjusted to provide the proper tension in the conveyor chain 95. The other conveyor supporting drum 94 which is mounted on shaft 92 forms the drive member for the conveyor with the shaft 92 being connected to the power drive for the machine.

The conveyor chain 95 comprises a series of connected link plate members 97 which are adapted to seat on the supporting drums 93 and 94. The drum 93 is hexagonal in section, providing around its periphery six seats for the chain forming members 97, and the drum 94 is octagonal in section, providing on its periphery eight seats for receiving the chain forming members 97.

The conveyor 12 comprises a plurality of chain plates 97 (Figs. 2 and 3) each of which has a central pivot receiving tongue 98 at one edge and a pair of laterally spaced pivot bearing tongues 99 at the opposite edge with adjacent plates being connected in chain formation by pivot pins 100. Each of the link plates 97 carries one of the suction cups 16. Each suction cup 16 comprises a funnel-shaped rubber section 101 and a tubular base section 102 which is mounted on a tubular nipple formation 103 extending outwardly of the plate 97. The tubular nipple 103 is part of a connector member 104 which has a flange or shoulder 105 which seats against the surface of the plate 97 and a threaded stem 106 which engages in a threaded aperture 107 in the plate 97. The stem 106 terminates in a tooth-like end formation 108 which projects from the lower face of the plate 97 and which is adapted to engage or seat in a cooperating socket formation or recess 109 in the face 110 of the conveyor end support member 94. The interengagement of the tooth formations 108 in the socket formations 109 insures positive movement of the conveyor 12 since the action is the same as a chain and sprocket connection between the link forming chain plates 97 and the sprocket forming end support member 94. The cup member 101 is provided with an internal flange or shoulder 111 which, when the cup is positioned on the nipple 103, is in spaced relation to the end of the nipple 103 to prevent damage to the egg which could otherwise occur through engagement of the same with the end of the nipple. Suction is, of course, applied through the passageway internally of the nipple 103 to be effective on the end of an egg positioned in the cup member 101 and to hold the same in the cup. The flange 111 also cooperates with the vacuum pull on the end of the egg to force the shell together in the case of a cracked egg and prevents loss of albumen which would otherwise occur due to the action of the vacuum. The conveyor end support or drum 94 is provided with a vacuum passageway 112 having a radial portion terminating in the socket formation 109 in the center of each face or seat 110 for the conveyor chain plates 97. The tooth formation 108 and the cooperating socket formation 109 are shaped to form a seal between the surfaces thereof while the plate 97 is seated on surface 110 of the drum 94 and the passageway 112 of the latter is connected to a suitable source of vacuum by means of a suction box 113 (Fig. 1) which is mounted at the end of the drum 94. The suction box 113 is provided with a suitable port (not shown) opening on the inner face which engages with the outer face of the drum 94, which port is aligned with the inner opening of the terminals of the passageways 112 for a portion of the movement of the drum 94 around the end of the conveyor. The suction box 113 is connected by suitable connecting members with a source of vacuum (not shown). As each plate 97 passes around the drum 94 suction is applied through the passageway 112 in the drum 94 to the cup member 101 which holds the one end of the egg in position therein.

Each conveyor chain plate 97 is provided with an upstanding pin 114 which has a curved upper portion 115 positioned closely adjacent the trailing edge of the cup 101 and which steadies the cup and the egg therein as it approaches the cracking station 13 and is centered or guided by a pair of depending guide rods which are pivotally mounted at their upper ends on a plate-like bracket 122 extending outwardly from the face of the frame support plate 90. The rods are connected by a tension spring (not shown) and are resiliently urged toward each other as the eggs move between the same on approaching the cracking station, and are centered for engagement of the free ends by the cooperating gripper mechanisms on the head 14.

As each egg moves around the end of the conveyor mechanism 12 with one end seated in a suction cup 16 thereon the opposite end is engaged by cooperating holding or gripping members of the cracking assembly 17 on the rotary head 14 while the shell is cracked.

As the cracking and holding assembly 17 and the cup 16 move apart in their respective paths, the two broken sections of the egg shell are separated and the contents is dumped into a separating device which has been moved into position beneath the cracking station 13.

The shell section which is retained in the cup 16 on the conveyor 12 is carried along the lower run of the conveyor 12, if it is not released when the suction is broken by movement of the cup beyond the supporting drum 94, until it reaches a point where the cone-shaped portion 101 of the cup 16 passes between a pair of shell discharging disks or rollers indicated at 158 which are mounted on a supporting bracket 160 extending forwardly of the frame support plate 90. The shell discharging rollers are spaced to provide a restricted passageway for the cup member 101 which results in a squeezing action on the cup member to break its hold on the shell.

The shaft 92 for the supporting drum 94 which operates the conveyor 12 and the shaft 126 for the cracking head 14 extend through the frame support plate 90 and are driven by suitable connections from the main drive shaft for the machine.

I claim:

1. In an egg cracking machine, an endless conveyor for supporting a plurality of eggs on end and for advancing the same in single file in a vertical plane to a cracking station, said conveyor comprising a series of pivotally connected chain link forming plate members, a pair of conveyor end supports, the conveyor end support at the leading end of the conveyor having a plurality of plane faces around its periphery against which the chain link plates are adapted to seat, each of said faces having a pocket forming aperture therein, each of said chain link plates being apertured and having a nipple mounted in the aperture, said nipple having an outwardly directed stem, a cone-shaped vacuum cup mounted on said stem, the inner end of said nipple being in the form of a tooth for engaging in said pocket forming apertures in the faces of said end support as the chain link plate advances around the same and said conveyor end support having a passageway extending from each of said pocket forming apertures, and means to connect said apertures with a vacuum for holding the eggs in said vacuum cups as they move around said end support.

2. In an egg cracking machine, an endless conveyor for supporting a plurality of eggs on end and for advancing the same in single file in a vertical plane to a cracking station, said conveyor comprising a series of pivotally connected plate-like link forming members, a pair of conveyor end supports, the conveyor end support at the leading end of the conveyor having a plurality of plane surfaces around its periphery with which successive link members on the chain engage, cooperating tooth and socket formations connecting each link member in driving relation with the end support as it engages with a plane surface thereon, said end support having a vacuum port on each of said link engaging surfaces, a hollow connecting nipple mounted on each link member, a cone shaped vacuum cup mounted on the outer end of said nipple, the inner end of said nipple being connected with a vacuum port in said end support as each link member engages with a plane surface thereon, and means to connect said ports with a vacuum for applying suction to the ends of the eggs in said vacuum cups as they move around said end support.

3. In an egg cracking machine, an endless conveyor for supporting a plurality of eggs on end and for advancing the same in single file in a vertical plane to a cracking station, said conveyor comprising a series of pivotally connected plate-like link forming members, a pair of conveyor end supports, one of the conveyor end supports having a plurality of plane surfaces around its periphery with which successive link members on the chain engage, said one end support having a vacuum port in each of said surfaces, a hollow connecting nipple mounted on each link member, a cone shaped vacuum cup mounted on the outer end of said nipple, the inner end of said nipple being connected with a vacuum port in said end support as each link member engages with a plane surface thereon, and means to connect said vacuum ports with a vacuum for applying suction to the ends of the eggs in said vacuum cups as they move around said end support.

4. In an egg cracking machine, an endless conveyor for supporting a plurality of eggs on end and for advancing the same in single file to a cracking station, said conveyor comprising a series of pivotally connected plate-like link forming members, a pair of conveyor end supports, the conveyor end support at the leading end of the conveyor having a plurality of plane surfaces around its periphery with which successive link members on the chain engage, each of said surfaces having a socket forming radial recess and a connecting bore, each link member having a nipple with an end portion projecting from the inner face for engaging in the recesses in the conveyor end support whereby to connect the same in driving relation with the end support as it engages with a plane surface thereon, a cone shaped vacuum cup mounted on the outer end of said nipple, and means to connect said bores with a vacuum for applying suction to the ends of the eggs in said vacuum cups as they move around said end support.

5. In an egg cracking machine, an endless conveyor for supporting a plurality of eggs on end and for advancing the same in single file to a cracking station, said conveyor comprising a series of pivotally connected plate-like link forming members, a pair of conveyor end supports, the conveyor end support at the leading end of the conveyor having a plurality of plane surfaces around its periphery with which successive link members on the chain engage, each of said plane surfaces having a recess, a hollow connecting nipple mounted on each link member, said nipple having a portion extending from the inner surface of its link member, a cone shaped vacuum cup mounted on the outer end of said nipple, the inner end of said nipple being adapted to engage in a recess in said conveyor end support as each link member engages with a plane surface thereon, and means to connect said recesses with a vacuum for applying suction to the ends of the eggs in said vacuum cups as they move around said end support.

References Cited in the file of this patent

UNITED STATES PATENTS

| | | |
|---|---|---|
| 2,071,859 | Steiner | Feb. 23, 1937 |
| 2,187,879 | Johnson | Jan. 23, 1940 |
| 2,443,188 | Hodson | June 15, 1948 |
| 2,477,031 | Armbrust | July 26, 1949 |
| 2,485,040 | Cupo | Oct. 18, 1949 |
| 2,536,057 | Hodson | Jan. 2, 1951 |
| 2,575,220 | Hiller | Nov. 13, 1951 |
| 2,704,594 | Gorby | Mar. 22, 1955 |